US011971217B2

(12) United States Patent
Oosterlaken et al.

(10) Patent No.: US 11,971,217 B2
(45) Date of Patent: Apr. 30, 2024

(54) BATCH FURNACE ASSEMBLY AND METHOD OF OPERATING A BATCH FURNACE ASSEMBLY

(71) Applicant: ASM IP Holding B.V., Almere (NL)

(72) Inventors: Theodorus G. M. Oosterlaken, Oudewater (NL); Lucian Jdira, Nieuw-Vennep (NL); Herbert Terhorst, Amersfoort (NL)

(73) Assignee: ASM IP Holding B.V., Almere (NL)

( * ) Notice: Subject to any disclaimer, the term of this patent is extended or adjusted under 35 U.S.C. 154(b) by 0 days.

(21) Appl. No.: 17/844,911

(22) Filed: Jun. 21, 2022

(65) Prior Publication Data

US 2022/0412652 A1 Dec. 29, 2022

Related U.S. Application Data

(60) Provisional application No. 63/214,620, filed on Jun. 24, 2021.

(51) Int. Cl.
*F27B 5/04* (2006.01)
*F27B 5/10* (2006.01)
(Continued)

(52) U.S. Cl.
CPC .................. *F27B 5/04* (2013.01); *F27B 5/10* (2013.01); *F27B 5/16* (2013.01); *F27B 5/18* (2013.01);
(Continued)

(58) Field of Classification Search
None
See application file for complete search history.

(56) References Cited

U.S. PATENT DOCUMENTS 7,351,057 B2 * 4/2008 Berenbak .......... H01L 21/67126 432/250
2005/0170306 A1 * 8/2005 Maria Oosterlaken ...................... H01L 21/67126 432/241

(Continued)

FOREIGN PATENT DOCUMENTS

KR 20060028874 A * 4/2006
KR 20070061942 A 6/2007

OTHER PUBLICATIONS

Sensors One, Measuring the difference in air pressure between rooms (Year: 2012).*

(Continued)

*Primary Examiner* — Michael G Hoang
*Assistant Examiner* — Kurt J Wolford
(74) *Attorney, Agent, or Firm* — Snell & Wilmer L.L.P.

(57) ABSTRACT

Batch furnace assembly for processing wafers, comprising a process chamber housing defining a process chamber and having a process chamber opening, a wafer boat housing defining a water boat chamber, a door assembly, a differential pressure sensor, and a controller. The door assembly has a closed position in which it closes off the process chamber opening. The door assembly defines in a closed position a door assembly chamber having a purge gas inlet for supplying purge gas to the door assembly chamber for gas sealingly separating the process chamber from the wafer boat chamber. The differential pressure sensor assembly fluidly connects to the door assembly chamber and is configured to determine a pressure difference between a pressure in the door assembly chamber and a reference pressure in a reference pressure chamber. The controller is configured to establish whether the pressure difference is in a desired pressure range.

13 Claims, 2 Drawing Sheets

(51) Int. Cl.
*F27B 5/16* (2006.01)
*F27B 5/18* (2006.01)
*F27D 1/18* (2006.01)
*F27D 3/00* (2006.01)

(52) U.S. Cl.
CPC ......... *F27D 1/1858* (2013.01); *F27D 3/0084* (2013.01)

(56) References Cited

U.S. PATENT DOCUMENTS

| | | | | |
|---|---|---|---|---|
| 2020/0083078 | A1* | 3/2020 | Kinoshita | H01L 21/67259 |
| 2020/0385868 | A1* | 12/2020 | Kim | C23C 16/4412 |

OTHER PUBLICATIONS

Pressure Sensors The Design Engineers' Guide (Year: 2020).*
KR-20060028874-A English translation (Year: 2006).*

* cited by examiner

BATCH FURNACE ASSEMBLY AND METHOD OF OPERATING A BATCH FURNACE ASSEMBLY

CROSS-REFERENCE TO RELATED APPLICATIONS

This application claims priority to U.S. Provisional Patent Application Ser. No. 63/214,620 filed Jun. 24, 2021, titled BATCH FURNACE ASSEMBLY AND METHOD OF OPERATING A BATCH FURNACE ASSEMBLY, the disclosure of which is hereby incorporated by reference in its entirety.

FIELD

The present disclosure generally relates to a batch furnace assembly for processing wafers, and a method of operating a batch furnace assembly.

BACKGROUND

A batch furnace assembly typically comprises a process chamber in which wafers are processes. In use a process gas may be administered to the process chamber for processing of the wafers. Such a process gas may be corrosive or otherwise aggressive. Typically, the process chamber housing is made of quartz, which is able to withstand high temperatures, and typically does not react with the process gasses.

The process chamber may comprise a closable door assembly to close off a process chamber opening via which a wafer boat may be transferred between the process chamber and a wafer boat chamber. Seals are used to gas tightly seal process chamber opening with the door assembly so as to shield the process chamber from the chamber's ambient environment and the wafer boat chamber. US 2005/0170306 (US'306) discloses a door assembly which defines in the closed position a door assembly chamber having a purge gas inlet for supplying purge gas to the door assembly chamber for gas sealing separating the process chamber from a wafer boat chamber. When the door assembly is in the closed position, purge gas is supplied to the door assembly chamber to generate an overpressure in door assembly chamber relative to the gas pressure inside the process chamber. This overpressure may prevent the process gas from escaping the process chamber and thus minimizes gas leakage and potential corrosion outside the process chamber.

SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

It is realized that it is important to seal the process chamber and minimize the chance of gas leakage from the process chamber.

Therefore, it may be an object to provide a batch furnace assembly with improved sealing security.

To that end, there may be provided a batch furnace assembly for processing wafers according to claim 1. More particularly, there may be provided a batch furnace assembly comprising a process chamber housing, a wafer boat housing, a door assembly, a differential pressure sensor assembly, and a controller. The process chamber housing may define a process chamber with a process gas inlet and an exhaust. The process chamber housing may have a process chamber opening. The wafer boat housing may define a wafer boat chamber. The process chamber opening may connect the process chamber with the wafer boat chamber for transferring wafer boats between the wafer boat chamber and the process chamber. The door assembly may have a closed position in which the door assembly closes off the process chamber opening. The door assembly may define in the closed position a door assembly chamber which may have a purge gas inlet for supplying purge gas to the door assembly chamber for gas sealingly separating the process chamber from the wafer boat chamber. The differential pressure sensor assembly may fluidly connect to the door assembly chamber and a reference pressure chamber and may be configured to determine a pressure difference between a pressure in the door assembly chamber and a reference pressure in the reference pressure chamber. The controller may be configured to establish whether the pressure difference is in a desired pressure range to confirm that the door assembly effectively closes off the process chamber opening.

There may also be provided a method of operating a batch furnace assembly according to claim 13. The batch furnace assembly may have a process chamber housing, a wafer boat housing, and a door assembly. The process chamber housing may define a process chamber with a process gas inlet and an exhaust. The process chamber housing may have a process chamber opening. The wafer boat housing may define a wafer boat chamber. The process chamber opening may connect the process chamber with the wafer boat chamber for transferring wafer boats between the wafer boat chamber and the process chamber. The door assembly may have a closed position in which the door assembly closes off the process chamber opening. The door assembly may define in the closed position a door assembly chamber having a purge gas inlet for supplying purge gas to the door assembly chamber for gas sealingly separating the process chamber from the wafer boat chamber. The method may comprise:

closing the process chamber opening with the door assembly;

determining a pressure difference between a pressure in the door assembly chamber and a reference pressure; and establishing whether the pressure difference is in a desired pressure range to confirm that the door assembly effectively closes off the process chamber opening.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

Various embodiments are claimed in the dependent claims, which will be further elucidated with reference to an example shown in the figures. The embodiments may be combined or may be applied separate from each other.

All of these embodiments are intended to be within the scope of the invention herein disclosed. These and other embodiments will become readily apparent to those skilled in the art from the following detailed description of certain embodiments having reference to the attached figures, the invention not being limited to any particular embodiment(s) disclosed.

BRIEF DESCRIPTION OF THE FIGURES

While the specification concludes with claims particularly pointing out and distinctly claiming what are regarded as embodiments of the invention, the advantages of embodiments of the disclosure may be more readily ascertained from the description of certain examples of the embodiments of the disclosure when read in conjunction with the accompanying drawings, in which:

DETAILED DESCRIPTION

Figure 1:
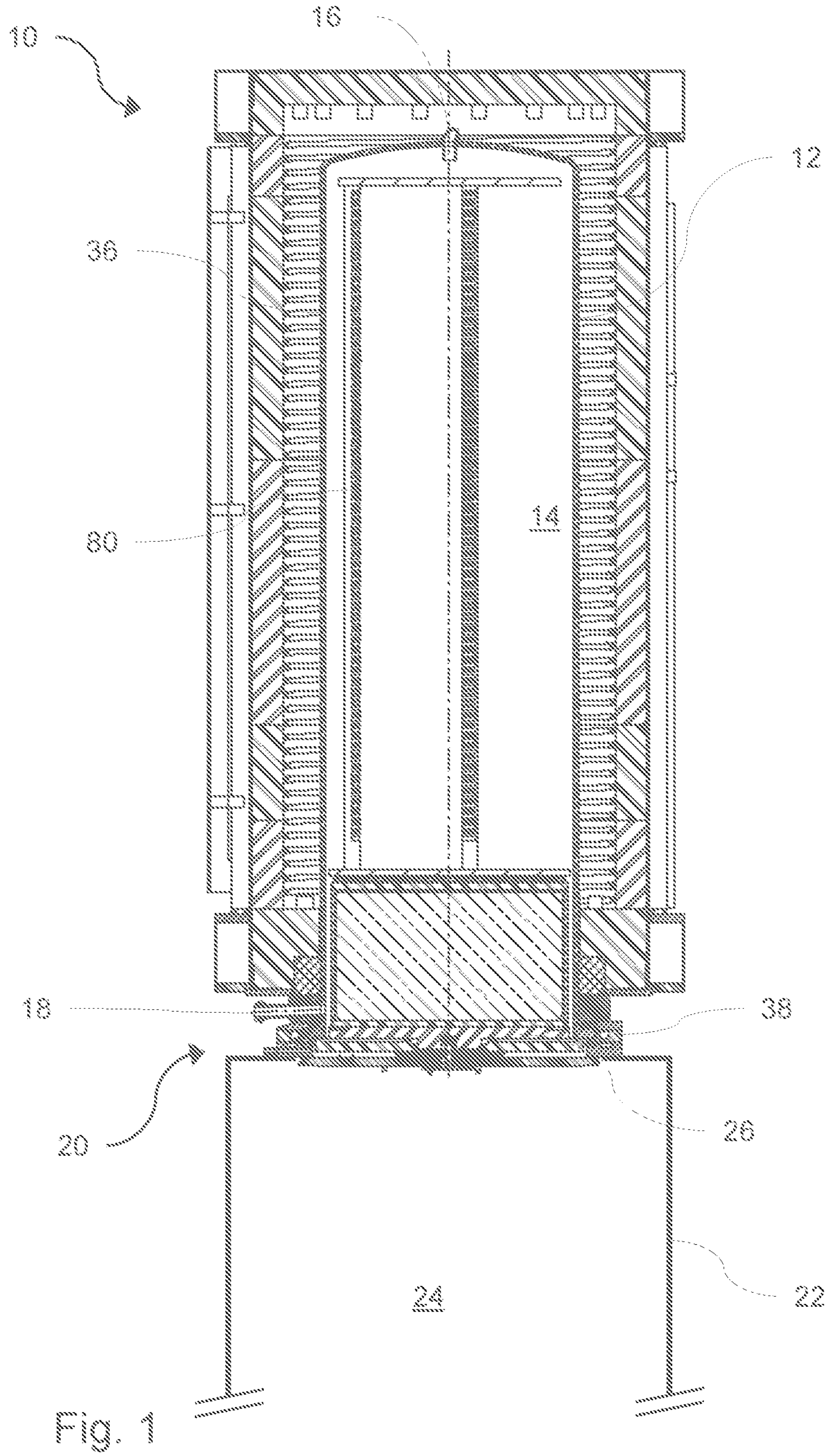
FIG. 1 shows a cross-sectional view of an example of a batch furnace assembly according to the description.

In this application similar or corresponding features are denoted by similar or corresponding reference signs. The description of the various embodiments is not limited to the example shown in the figures and the reference numbers used in the detailed description and the claims are not intended to limit the description of the embodiments, but are included to elucidate the embodiments.

Although certain embodiments and examples are disclosed below, it will be understood by those in the art that the invention extends beyond the specifically disclosed embodiments and/or uses of the invention and obvious modifications and equivalents thereof. Thus, it is intended that the scope of the invention disclosed should not be limited by the particular disclosed embodiments described below. The illustrations presented herein are not meant to be actual views of any particular material, structure, or device, but are merely idealized representations that are used to describe embodiments of the disclosure.

As used herein, the term "wafer" may refer to any underlying material or materials that may be used, or upon which, a device, a circuit, or a film may be formed.

In the most general terms the present disclosure may provide a batch furnace assembly 10. The batch furnace assembly 10 may be configured for processing wafers. The batch furnace assembly 10 may comprise a process chamber housing 12, a wafer boat housing 22, a door assembly 26, a differential pressure sensor assembly 32, and a controller 34. The process chamber housing 12 may define a process chamber 14 with a process gas inlet 16 and an exhaust 18. The process chamber housing 12 may have a process chamber opening 20. The wafer boat housing 22 may define a wafer boat chamber 24. The process chamber opening 20 may connect the process chamber 14 with the wafer boat chamber 24 for transferring wafer boats 80 between the wafer boat chamber 24 and the process chamber 14. The door assembly 26 may have a closed position in which the door assembly 26 closes off the process chamber opening 20. The door assembly 26 may define in the closed position a door assembly chamber 28. The door assembly chamber 28 may have a purge gas inlet 30 for supplying purge gas to the door assembly chamber 28 for gas sealingly separating the process chamber 14 from the wafer boat chamber 24. The differential pressure sensor assembly 32 may be fluidly connected to the door assembly chamber 28 and a reference pressure chamber 18, 24. The differential pressure sensor assembly 32 may be configured to determine a pressure difference between a pressure in the door assembly chamber 28 and a reference pressure in the reference pressure chamber 18, 24. The controller 34 may be configured to establish whether the pressure difference is in a desired pressure range to confirm that the door assembly 26 effectively closes off the process chamber opening 20.

Figure 2:
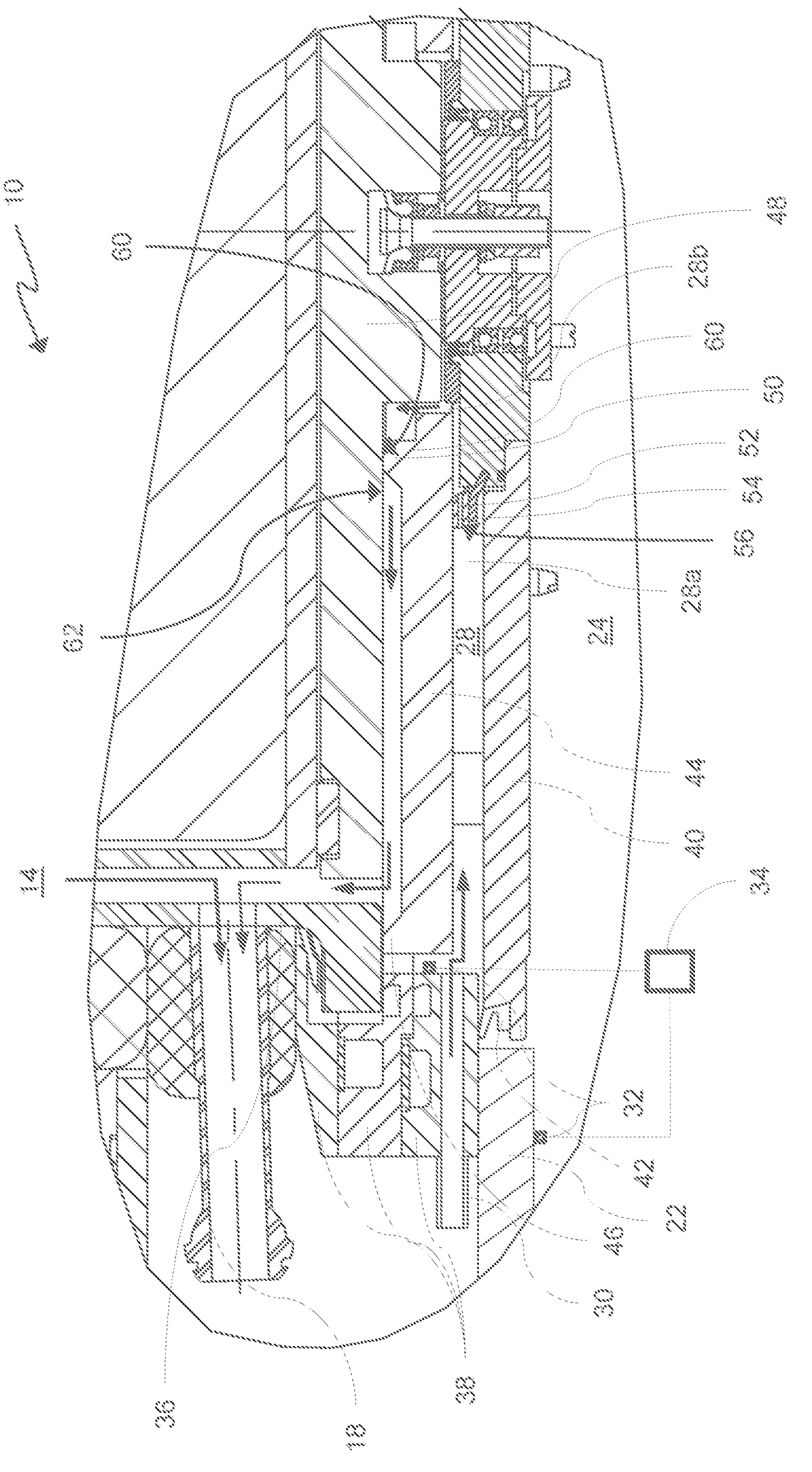
FIG. 2 shows a bottom detail of FIG. 1.

By virtue of the differential pressure sensor assembly 32 the pressure difference between the door assembly chamber 28 and the reference pressure chamber 18, 24 may be determined. The differential pressure sensor assembly 32 may comprise a differential pressure sensor, which determines the differential pressure between the door assembly chamber 28 and the reference pressure chamber 18, 24. Alternatively, as shown in FIG. 2, the differential pressure sensor assembly 32 may comprise a first pressure sensor which determines the pressure in the door assembly chamber 28 and a second pressure sensor which determines the pressure in the reference pressure chamber 18, 24. The reference pressure chamber may e.g. be the wafer boat chamber 24, which would mean that the reference pressure may be a pressure in the wafer boat chamber 24. Said pressure in the wafer boat chamber 24 relative to a pressure in the process chamber 14 may be known. It may then be possible to compare the determined pressure difference with a desired pressure difference with respect to the know reference pressure. If the pressure difference is in the desired pressure range, the conclusion may be made that the door assembly is effectively closed. However, when the pressure difference is not in the desired pressure range, the conclusion may be that the door is not effectively closed. Thus, an effective check may be provided to establish whether closing of the door assembly has, indeed, been effected. When the pressure difference is not in the desired pressure range, preferably no process gas may be supplied to the process chamber 14. The controller 34 can thus confirm that the door assembly 26 may effectively close off the process chamber opening 20 when the pressure difference is in the desired pressure range. The controller 34 may thus also confirm that the door assembly may not effectively close off the process chamber opening 20 when the pressure difference is not in the desired pressure range.

In an embodiment, of which an example is shown in the FIG. 2, the reference pressure chamber 18, 24 may be the wafer boat chamber 24 and the reference pressure may be a pressure in the wafer boat chamber 24. Alternatively, the reference pressure chamber 18, 24 may be the exhaust 18 and the reference pressure may be a pressure in the exhaust 18.

Both the pressure in the wafer boat chamber 24 and the exhaust 18 are typically known in a batch furnace assembly 10. The pressure in the wafer boat chamber 24 may typically be set above the pressure in the process chamber 14. This may ensure that, when the door assembly 26 is closed, process gasses may not enter the wafer boat chamber 24. The pressure in the wafer boat chamber 24 may e.g., be 800 Pascal above the pressure in the process chamber 14. The pressure in the door assembly chamber 28 may be kept higher to ensure that there is a pressure difference to be detected. The pressure in the exhaust 18 may typically be set below the pressure in the process chamber 14. This may ensure that the process gas flow to the exhaust 18. The pressure in the exhaust 18 may e.g. be 150 Pascal below the pressure in the process chamber 14. The pressure difference may be determined with respect to either of these two pressures. Preferably the pressure difference may be between the pressure in the door assembly chamber 28 and the pressure in the wafer boat chamber 24.

In an embodiment, of which an example is shown in the figures, the process chamber housing 12 may comprise a quartz tube 36 and a metal flange 38 which supports the quartz tube 36. The door assembly 26 may comprise a first door plate 40 which may include a first seal 42 which engages in the closed position the metal flange 38 of the process chamber housing 12. The door assembly 26 may also comprise a second door plate 44 which may include a second seal 46 which engages in the closed position the quartz tube 36 of the process chamber housing 12. The door assembly 26 may further comprise a third door plate 48 which may be rotatably mounted relative to the first 40 and the second 44 door plates. The door assembly 26 may still further comprise a diffusion barrier 50 between the second door plate 44 and the rotatable third door plate 48. The door assembly chamber 28 in the closed position of the door assembly 26 may be bounded by the first seal 42 and the diffusion barrier 50. In use, purge gas supplied via the purge gas inlet 30 may flow via the diffusion barrier 50 to the exhaust 18.

By way of non-limiting example, the pressure in the wafer boat chamber 24 may be 800 Pa higher than the pressure in the process chamber 14, the pressure in the door assembly chamber 28 by be 350 Pa higher than the pressure in the wafer boat chamber 24 and the pressure in the exhaust 18 may be 150 Pa lower than the pressure in the process chamber. When in this example, the gas pressure in the wafer boat chamber 24 is used as reference pressure, the desired pressure range of the pressure difference may, for example, be from 300 to 400 Pa, that is a higher pressure in the door assembly chamber 28 than in the wafer boat chamber 24. In case the pressure difference is below 300 Pa, that may be an indication that the door assembly 26 is not properly closed and the controller may, for example, provide a warning signal and/or refrain from supplying process gas to the process chamber 14. This pressure difference may be obtained while supplying the purge gas to the door assembly chamber 28 with a substantially constant volume flow rate. In an example, the substantially fixed volume flow rate may be 5 slm.

In the alternative embodiment, in which the pressure in the door assembly chamber 28 is compared with the pressure in the exhaust 18, with the above described examples of pressure values, the desired pressure range of the pressure difference may, for example, be from 1200 to 1400 Pa, in which the pressure in the door assembly chamber 28 is higher than the pressure in the exhaust 18. When, in this embodiment, the pressure difference drops below 1200 Pa, this may be an indication that the door assembly 26 does not effectively closes off the process chamber opening 20 and a warning signal may be dispatched and/or the controller may refrain from supplying process gas to the process chamber 14.

In general, when the door assembly 26 is properly closed, the gas pressure in the door assembly chamber 28 may be higher than the gas pressure in the process chamber 14 and also higher than in the wafer boat chamber 24.

Under such conditions, the flow path of the purge gas in the closed position of the door assembly 26 may be as indicated with the arrows in FIG. 2. The purge gas may flow from the purge gas inlet 30 into the door assembly chamber 28 which may be substantially sandwiched between the first door plate 40 and the second door plate 44. The purge gas inlet 30 may be positioned in the metal flange 38 of the process chamber housing 12. Because of the overpressure of the wafer boat chamber 24 with respect to the process chamber 14, the purge gas may leave the door assembly chamber 28 via the diffusion barrier 50, which may be situated between the second door plate 44 and the rotatable third door plate 48. This diffusion barrier 50 may function as a seal between the process chamber 14 and the door assembly chamber 28. After passing the diffusion barrier 50, the purge gas may flow to the exhaust 18, which typically has a lower pressure than the process chamber 14.

In an embodiment the purge gas supplied via the purge gas inlet 30 may be supplied with a substantially fixed volume flow rate. The door assembly chamber 28 may comprise a flow restriction 52. In use, the flow of purge gas from the purge gas inlet 30 to the diffusion barrier 50 may be through the flow restriction 52 in the door assembly chamber 28. The differential pressure sensor assembly 32 may be fluidly connected to a first door assembly chamber part **28*a* which is upstream from the flow restriction 52 when viewed in the flow direction of the purge gas. As shown in FIG. 2, the batch furnace assembly 10 may comprise a quartz ring 54 between the first door plate 40 and the second door plate 44. The flow restriction 52 may be at least one orifice 56 in the quartz ring 54. Of course other examples of the flow restriction 52** are not excluded by this description.

When the door assembly is closed, the purge gas supplied via the purge gas inlet 30 may only flow to the exhaust 18. Because of the diffusion barrier 50 which may act as a restriction, automatically a pressure may build up in the door assembly chamber 28. This pressure may be set as an overpressure by correctly dimensioning the door assembly chamber 28 and the diffusion barrier 50. In this way an overpressure may be generated which may be achieved by a supply of purge gas with a fixed volume flow rate. The flow restriction 52 in the door assembly chamber 28 may divide the door assembly chamber 28 into the first door assembly chamber part **28*a* upstream of the flow restriction 52 and a second door assembly chamber part 28*b* downstream of the flow restriction 52. The two door assembly chamber parts 28*a*, 28*b* may have different pressures. The flow restriction 52 in combination with the fixed flow rate, may determine a pressure in the first door assembly chamber part 28*a*, which is upstream of the flow restriction 52, to be higher than a pressure in the second door assembly chamber part 28*b*, which is downstream of the flow restriction 52. The first door assembly chamber part 28*a*** may be used to measure the differential pressure.

In an embodiment, as shown in FIG. 1, the rotatable third door plate 48 may be configured to support a wafer boat 80.

The door assembly 26 may thus support the wafer boat 80 and may move the wafer boat between the process chamber 14 for processing and the wafer boat chamber 24 for loading and/or unloading wafers from the wafer boat 80. The rotatable third door plate 48 may rotate the wafer boat 80 during processing, which may enhance uniform processing of the wafers in the wafer boat 80.

In an embodiment, of which en example is shown in FIG. 2, the diffusion barrier 50 may comprise a ring-shaped protrusion 58 on the second door plate 44 having a top 60 which is positioned close to a bottom surface 62 of the third door plate 48. Of course, in an alternative embodiment, the diffusion barrier 50 may comprise a ring-shaped protrusion on the third door plate 48, wherein the protrusion may have a downwardly directed top which may be positioned close to a top surface of the second door plate 44. Other configurations for creating a diffusion barrier may be contemplated.

In an embodiment, of which an example is shown in FIG. 1, the exhaust 18 may be situated at a side of the process chamber housing 12 near the process chamber opening 20. The process gas inlet 16 may be situated at an opposite end of the process chamber housing 12. In use, a process gas may flow from the process gas inlet 16 through the process chamber 14 to the exhaust 18.

Having the process gas inlet 16 and the exhaust 18 on opposite ends of the process chamber housing 12 may ensure a uniform flow of process gas from the process gas inlet 16 to the exhaust 18. By having the exhaust 18 near the process chamber opening 20, the exhaust 18 may also be near the door assembly chamber 28, which may ensure a short flow path for the purge gas from the door assembly chamber 28 to the exhaust 28. In this way, the chance of disturbance of the process in the process chamber 14 as a consequence of inflowing purge gas from the door assembly chamber 28 is minimized because the purge gas will directly flow to the lowest pressure area, i.e. to the exhaust 18.

In an embodiment, of which an example is shown in the figures, the batch furnace assembly 10 may be vertical batch furnace assembly, wherein the wafer boat chamber 24 is situated below the process chamber 14.

Such a vertical batch furnace assembly 10 may be customary in the field of wafer processing machines and has known advantages. It has e.g., a relatively small footprint and thus occupies less valuable floorspace.

The present disclosure may also provide a method of operating a batch furnace assembly 10. The batch furnace assembly may have a process chamber housing 12, a wafer boat housing 22, and a door assembly 26. The process chamber housing 12 may define a process chamber 14 with a process gas inlet 16 and an exhaust 18. The process chamber housing 12 may have a process chamber opening 20. The wafer boat housing 22 may define a wafer boat chamber 24. The process chamber opening 20 may connect the process chamber 14 with the wafer boat chamber 24 for transferring wafer boats 80 between the wafer boat chamber 24 and the process chamber 14. The door assembly 26 may have a closed position in which the door assembly 26 closes off the process chamber opening 20. The door assembly 26 may define in the closed position a door assembly chamber 28. The door assembly chamber 28 may have a purge gas inlet 30 for supplying purge gas to the door assembly chamber 28 for gas sealingly separating the process chamber 14 from the wafer boat chamber 24.

The method may comprise:

closing the process chamber opening 20 with the door assembly 26;

determining a pressure difference between a pressure in the door assembly chamber 28 and a reference pressure; and establishing whether the pressure difference is in a desired pressure range to confirm that the door assembly 26 effectively closes off the process chamber opening 20.

The effects and advantages of the method are similar to the effects and advantages described above in relation to the batch furnace assembly 10 and these effects and advantages are inserted here by reference.

In an embodiment, of which an example is shown in FIG. 2, the reference pressure may be a pressure in the wafer boat chamber 24. Alternatively, of which no example is shown in the figures, the reference pressure may be a pressure in the exhaust 18.

Both the pressure in the wafer boat chamber 24 and the exhaust 18 are typically known in a batch furnace assembly 10. The pressure in the wafer boat chamber 24 may typically be set above the pressure in the process chamber 14. This may ensure that, even when the door assembly 26 is not properly closed, process gasses may be prevented from flowing into the wafer boat chamber 24. Thus, chance of the occurrence of a dangerous situation may be minimized and the corrosion of metal parts of the door assembly 26 and of the wafer boat chamber 28 may be prevented. The pressure in the door assembly chamber 28 may be kept higher to ensure that gas from the wafer boat chamber 24 cannot pass the door assembly chamber 28 and then enter the process chamber 14. The pressure in the door assembly chamber 28 may, for example, be 350 Pa higher than the pressure in the wafer boat chamber 24 when the door assembly 26 is in a properly closed position. The pressure in the exhaust 18 may typically be set below the pressure in the process chamber 14. This may ensure that the process gas flows to the exhaust 18. The pressure difference may be determined with respect to either of these two pressures. Preferably the pressure difference may be between the pressure in the door assembly chamber 28 and the pressure in the wafer boat chamber 24.

In an embodiment, the method further comprises supplying a substantially fixed volume flow rate of the purge gas supplied via the purge gas inlet 16 to the door assembly chamber 28.

When the door assembly is closed, the purge gas supplied via the purge gas inlet 30 may only flow to the exhaust 18. Because of the diffusion barrier 50 which may act as a restriction, automatically a pressure is build up in the door assembly chamber 28. This pressure may be set as an overpressure by correctly dimensioning the door assembly chamber 28 and the diffusion barrier 50. In this way an overpressure may be generated which may be achieved by a supply of purge gas with a fixed volume flow rate.

In an embodiment, the substantially fixed volume flow rate of the purge gas supply via the purge gas inlet 16 to the door assembly chamber 28 may be between 1 and 10, preferably 4 and 6 slm.

In an embodiment in which the pressure in the door assembly chamber 28 is compared with the pressure in the wafer boat chamber 24, the desired pressure range of the pressure difference may be 300 Pa or higher, wherein the pressure in the door assembly chamber 28 is higher than the pressure in the wafer boat chamber.

When the pressure difference is in that range, it may be concluded that the door assembly 26 is effectively closed. If the pressure difference is not reached, it may be concluded that the purge gas leaks away to the wafer boat chamber 28 or elsewhere which may be caused by a not properly closed door assembly 26.

In an embodiment in which the pressure in the door assembly chamber 28 is compared with the pressure in the exhaust 18, the desired pressure range of the pressure difference may be 1150 Pa or higher, wherein the pressure in the door assembly chamber 28 is higher than the pressure in the wafer boat chamber. Again, this range provides sufficient security to provide a reliable check of whether the door assembly 26 is closed or not.

In an embodiment, the pressure in the wafer boat chamber 24 may approximately be 200 to 1000 Pa, preferably 750 to 850 Pa higher than the pressure in the process chamber 14. Such a pressure difference provides an acceptable level of security to reduce the chance of leakage of process gas from the process chamber 14 to the wafer boat chamber 24, even when the door assembly 26 is not properly closed.

In an embodiment, the pressure in the exhaust 18 may be approximately 50 to 400 Pa, preferably 100 to 200 Pa lower than the pressure in the process chamber 14. This pressure range in the exhaust provides a nice flow pattern in the process chamber 14 without turbulence in the relevant areas and at the same time ensures a sufficient exhaust of process gas from the process chamber 14.

In an embodiment the method may comprise starting processing wafers in the process chamber 14 only if the pressure difference is in the desired pressure range.

By first establishing whether the whether the pressure difference is in the desired pressure range it may be confirmed that the door assembly 26 effectively closes off the process chamber opening 20. By only starting processing wafer when the process chamber opening 20 is effectively closed, it may be ensured that the process gas may not leak to the wafer boat chamber 24 or other parts of the batch furnace assembly.

In an embodiment, the method may comprise generating a warning signal if the pressure difference does not reach the desired pressure range. Such a warning signal warns the operator to check the batch furnace assembly 10, in particular to check the door assembly 26 thereof and its interaction with the process chamber housing 12.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this description are not necessarily all referring to the same embodiment.

Furthermore, it is noted that particular features, structures, or characteristics of one or more of the various embodiments which are described above may be used implemented independently from one another and may be combined in any suitable manner to form new, not explicitly described embodiments. The reference numbers used in the detailed description and the claims do not limit the description of the embodiments, nor do they limit the claims. The reference numbers are solely used to clarify.

Legend

10—batch furnace assembly
12—process chamber housing
14—process chamber
16—process gas inlet
18—exhaust
20—process chamber opening
22—wafer boat housing
24—wafer boat chamber
26—door assembly
28—door assembly chamber
28*a*—first door assembly chamber part
28*b*—second door assembly chamber part
30—purge gas inlet
32—differential pressure sensor assembly
34—controller
36—quartz tube
38—metal flange
40—first door plate
42—first seal
44—second door plate
46—second seal
48—third door plate
50—diffusion barrier
52—flow restriction
54—quartz ring
56—orifice
58—protrusion
60—top (of protrusion)
62—bottom surface (of third door plate)
80—wafer boat

The invention claimed is:

1. A batch furnace assembly for processing wafers, comprising:

a process chamber housing defining a process chamber with a process gas inlet and an exhaust wherein the process chamber housing has a process chamber opening;

a wafer boat housing defining a wafer boat chamber, wherein the process chamber opening connects the process chamber with the wafer boat chamber for transferring wafer boats between the wafer boat chamber and the process chamber;

a door assembly having a closed position in which the door assembly closes off the process chamber opening, wherein the door assembly defines in the closed position a door assembly chamber having a purge gas inlet for supplying purge gas to the door assembly chamber for gas sealingly separating the process chamber from the wafer boat chamber;

a differential pressure sensor assembly fluidly connected to the door assembly chamber and a reference pressure chamber within the wafer boat housing and configured to determine a pressure difference between a pressure in the door assembly chamber and a reference pressure in the reference pressure chamber, the differential pressure assembly comprising a pressure sensor within the door assembly chamber and a pressure sensor within the reference pressure chamber; and a controller configured to compare the pressure difference with a desired pressure difference based on a pressure difference between the process chamber and the reference pressure chamber to establish whether the pressure difference is in a desired pressure range to confirm that the door assembly effectively closes off the process chamber opening.

2. The batch furnace assembly according to claim 1, wherein the reference pressure chamber is the wafer boat chamber and the reference pressure is a pressure in the wafer boat chamber.

3. The batch furnace assembly according to claim 1, wherein the batch furnace assembly is configured to determine a pressure within the process chamber.

4. The batch furnace assembly according to claim 1, wherein the process chamber housing comprises a quartz tube and a metal flange which supports the quartz tube;

wherein the door assembly comprises:

a first door plate including a first seal which engages in the closed position the metal flange of the process chamber housing;

a second door plate including a second seal which engages in the closed position the quartz tube of the process chamber housing;

a third door plate which is rotatably mounted relative to the first and the second door plates; and a diffusion barrier between the second door plate and the rotatable third door plate, and wherein the door assembly chamber in the closed position of the door assembly is bounded by the first seal and the diffusion barrier, wherein, in use, purge gas supplied via the purge gas inlet flows via the diffusion barrier to the exhaust.

5. The batch furnace assembly according to claim 4, wherein the door assembly chamber comprises a flow restriction, and wherein, in use, the flow of purge gas from the purge gas inlet to the diffusion barrier flows through the flow restriction in the door assembly chamber.

6. The batch furnace assembly according claim 5, comprising a quartz ring between the first door plate and the second door plate, wherein the flow restriction is at least one orifice in the quartz ring.

7. The batch furnace assembly according to claim 4, wherein the rotatable third door plate is configured to support a wafer boat.

8. The batch furnace assembly according to claim 4, wherein the diffusion barrier comprises a ring-shaped protrusion on the second door plate having a top which is positioned close to a bottom surface of the third door plate.

9. The batch furnace assembly according to claim 1, wherein, in use, the purge gas supplied via the purge gas inlet is supplied with a substantially fixed volume flow rate.

10. The batch furnace assembly according to claim 1, wherein the exhaust is situated at a side of the process chamber housing near the process chamber opening, wherein the process gas inlet is situated at an opposite end of the process chamber housing, and wherein, in use, a process gas flows from the process gas inlet through the process chamber to the exhaust.

11. The batch furnace assembly according to claim 1, wherein the batch furnace assembly is a vertical batch furnace assembly, wherein the wafer boat chamber is situated below the process chamber.

12. The batch furnace according to claim 1, wherein the controller refrains from supplying process gas to the process chamber when the pressure difference is not in the desired pressure range.

13. The batch furnace assembly according to claim 12, wherein the controller generates a warning signal if the pressure difference does not reach the desired pressure range.

* * * * *